Feb. 18, 1947.  T. HOWARD ET AL  2,416,006
PEANUT DIGGER
Filed Aug. 31, 1944  2 Sheets-Sheet 2
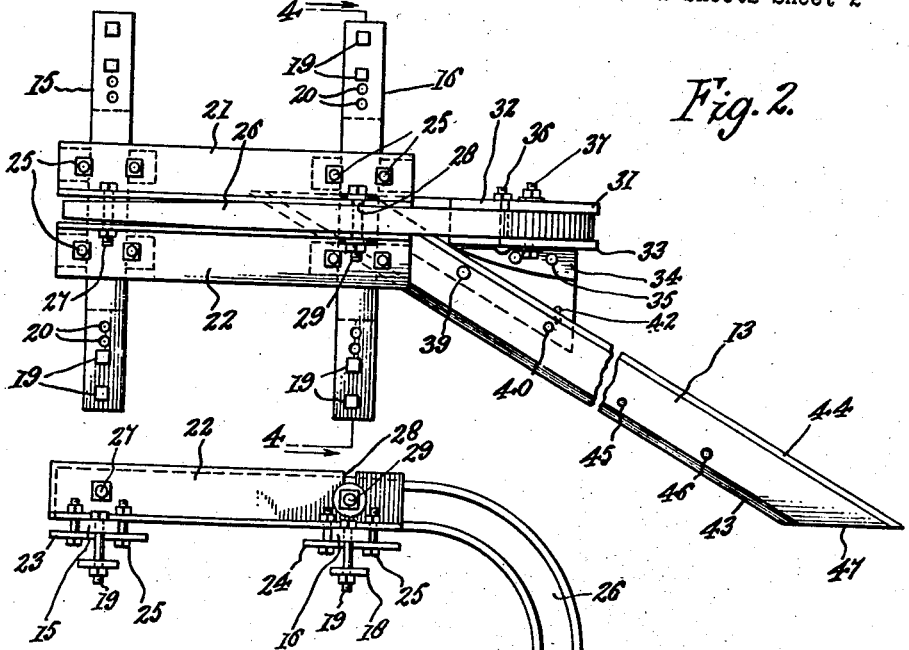
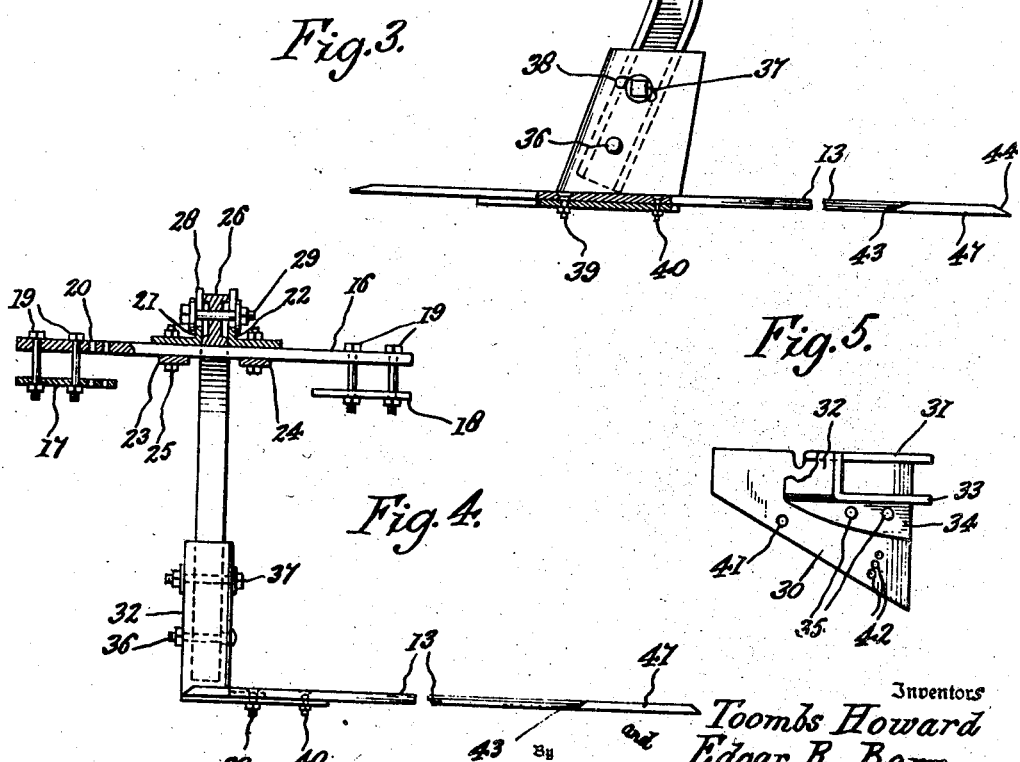
Inventors
Toombs Howard
Edgar R. Barr
Wilkinson & Mawhinney
Attorneys Patented Feb. 18, 1947

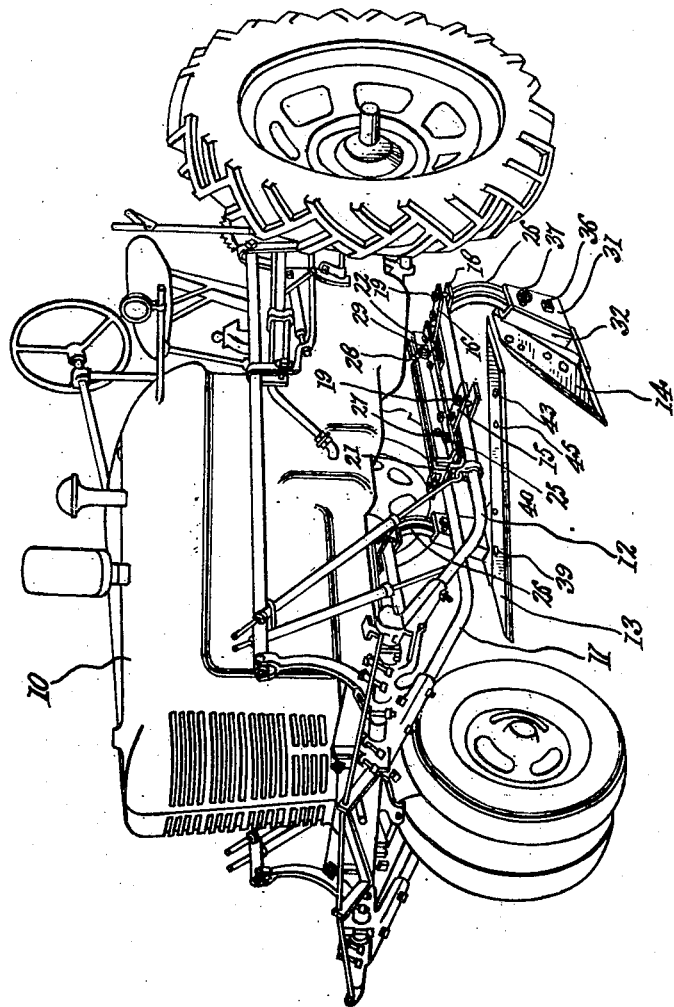

2,416,006

UNITED STATES PATENT OFFICE 2,416,006

PEANUT DIGGER

Toombs Howard and Edgar R. Barr, Columbus, Ga., assignors to Columbus Iron Works Company, Columbus, Ga., a corporation of Georgia Application August 31, 1944, Serial No. 552,160

3 Claims. (Cl. 55—9)

The present invention relates to improvements in peanut harvesting plows and has for an object to provide an improved plow for the harvesting of peanuts without injuring the tap roots.

Another object of the invention is to provide an improved peanut plow as an adjunct and accessory to a tractor cultivator of a conventional type wherein the added parts are few, simple and easily and readily accommodated to the cultivator attachment.

A further object of the invention resides in providing an improved peanut plow in which a variety of adjustments are afforded to bring the cutter blades to a correct depth and correct angle for most efficient severing of the vines and the clusters of peanuts without disturbing the tap root which may remain in the ground for refertilization.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a tractor cultivator of a standard type having mounted thereon a peanut plow attachment constructed in accordance with the present invention.

Figure 2 is a top plan view, taken on an enlarged scale, of one of the plow units, being the right hand plow as removed from the tractor.

Figure 3 is a side elevation of the plow shown in Figure 2 with a portion of the frog and blade shown in section.

Figure 4 is a transverse section taken on the line 4—4 in Figure 2, and

Figure 5 is a top plan view of the frog disassembled from the other parts.

Referring more particularly to the drawings 10 designates generally a tractor of a construction and type well known in agricultural work and 11 and 12 designate the cultivator attachment rods which are standard equipment on present forms of cultivator tractors.

The invention consists of one or more attachments that may be fitted to the pairs of cultivator rods 11 and 12 at each side of the tractor 10. In the instance shown two plow blades 13 and 14 are supplied having their cutting edges angularly inclined and mutually converging rearwardly. Inasmuch as both right and left hand units are identical save for position of the parts, it will suffice to describe one of the units.

Two or more cross bars 15 and 16 support the plow upon the cultivator rods 11 and 12. The cross bars straddle the pair of cultivator rods 11 and 12 and rest thereon with the ends extending beyond the outer portions of the rods. Clamp plates 17 and 18 engage beneath the rods 11 and 12 and are affixed to the cross bars 15 and 16 by the bolts 19. Additional perforations 20 may be formed in vertical alignment to receive the inner bolts 19 in a selective manner to accommodate wider or narrower cultivator rods 11, 12.

The cross bars 15 and 16 support angle irons 21 and 22 having their horizontal webs resting on intermediate portions of the cross bars 15 and 16 and with their vertical webs disposed mutually toward one another but in spaced relation. Clamp plates 23 and 24 are carried by the horizontal webs of the angle irons 21 and 22 and extend beneath the cross bars 15 and 16, there being bolts or other fastenings 25 uniting the angle irons with their clamp plates 23 and 24. Whereas the cross bars 15 and 16 extend transversely of the longitudinal center of the tractor cultivator 10, the angle irons 21 and 22 extend lengthwise of the tractor.

The vertical webs of the angle irons 21 and 22 receive therebetween the beam 26 of the plow which beam may be curved as indicated in Figure 3 and having its lower stock end received in a frog to which the blade 13 is attached.

The forward end of the plow beam is pivoted or bolted at 27 to the angle irons 21 and 22. Near the rear end portions of the angle irons vertically elongated slots 28 are made in the upstanding webs, such slots opening through the upper edges of the webs and such slots receiving therethrough the end portions of a bolt or pin 29 carried by the beam 26.

The frog is preferably made in two parts consisting of a bottom plate 30 with an upstanding wall 31 along the rear portion of its outer edge and constituting one of the sections while the other section is comprised of the forward wall 32, the inner side wall 33 and the inturned flange 34. The front wall 32 and the inner side wall 33 engage at their lower edges upon the bottom plate 30 and the flange 34 rests upon the bottom plate 30 and may be secured thereto by bolts 35 or other fastening means. The outer rear edge of the front wall 32 is contiguous to the front edge of the outer side wall 31. The two side walls 31 and 33 which are spaced apart and the front wall 32 form a box or casing to receive the lower stock end of the plow beam 26, such plow beam being pivoted by a bolt or other member 36 in the lower portion of the frog casing. Spaced above this pivot point 36 a bolt or other fastening 37 engages through arcuate slots 38 in the side walls 31 and 33 which slots extend generally in a horizontal direction having their curvature struck from the center 36 as a radius. This bolt 37 is carried at its central portion by the beam 26. The slots 28 may also if desired be struck on a curve the center of which is the pivot point 27.

As clearly seen in Figure 5, the bottom frog plate 30 may be of a generally triangular shape with its forward apex truncated and with its hypotenuse arranged on the inner side of the plate. This hypotenuse may extend on an angle or inclination conforming generally to that of the inclination given the blade 13. The blade 13 is adjustably carried by the bottom plate 30 by means of a bolt or other pivot 39 and a bolt or other fastening 40. The pivot 39 engages through a plate perforation 41 while the fastening 40 may be engaged selectively with any one of a series of holes 42 in the frog bottom plate 30. The holes 42 may be in a curved series struck from the center of the perforation 41.

The blade 13 has two cutting edges 43 and 44 and a double set of apertures 45 and 46 for engagement with the bolts 39 and 40 so as to be reversible. The ends of the blade 13 are cut off at angles 47 to enable the ends to lie substantially in the direction of movement of the blade so that the entire forward cutting edge of the blade will be reinforced by linear portions of the blade direct to the rear cutting edge and there will be no projecting portions of the blade which might be subjected to strain without having the full support of the entire transverse mass of the blade.

When the beam 26 is level the blade 13 ordinarily has the right depth to cut roots of peanut vines just along the nuts so as to leave the tap root in the ground.

One plow may be mounted upon a cultivator if desired but a set of plows consists of one right hand and one left hand plow enabling two rows of peanuts to be dug at one time.

The slots 28 and bolt 29 are provided so that the plow may release itself if the point 13 strikes an immovable object. In this event the ends of the bolt 29 will be forced upwardly out of the slots 28, the beam 26 pivoting on the forward stud 27.

The part 12 may be an extra heavy channel beam. The slots 38 at the top of the frog enable an extra heavy beam 26 to be raised or lowered as desired.

The frog is preferably made from two pieces of extra heavy steel. The bottom plate 30 gives the blade 13 the exact set from one end to the other as the blade bolts to the flat surface of the frog bottom plate 30. The top member of the frog consisting of the walls 32 and 33 and the flange 34 bolts to the bottom piece 30 to reinforce it. This top piece is also bolted to the beam 26 to make the plow more substantial. The top piece of the frog also forms a hood for the bottom piece and the beam so that vines will not hang and choke the plow. The frog is designed so as to place the beam 26 at the extreme end of the blade 13 and to allow passage of vines before the roots are cut, this feature keeping the plow from choking.

The rear bolt 40 is light so that the blade 13 will shear this bolt in case the blade strikes a root, rock or any immovable object.

The blade is preferably made from double bevel high carbon steel and is reversible, giving long life and double wear. It is extra heavy so that blade remains rigid, assuring an even cut from the point to end of blade. Blades are furnished in 30" and 42" lengths.

There is a cooperation between the two adjustments provided by the bolts 29 and 37. By loosening the bolt 29 the beam 26 may be adjusted up and down in a vertical sense pivoting about the center 27. The nut of the bolt 29 may then be tightened to bind upon the side walls of the slots 28, washers being shown between the bolt head and the nut for the purpose of giving extensive friction surface engagement against the sides of the angle irons 21 and 22. In this way the adjustment may be preserved except when a superior force kicks the beam 26 upwardly forcing the bolt 29 out of the slots 28. It will be noted that this adjustment is substantially vertical and that in making any such adjustment the horizontality of the plate blade 13 is disturbed. To correct this, an adverse condition to plowing, the plate 13 is movable about the pivot 36 when the nut of the bolt 37 is loosened. After the blade 13 is readjusted to a correct horizontal position, the nut of the bolt 37 is retightened to preserve the horizontal adjustment. Thus the blade 13 may be adjusted up and down to different horizontal planes consistent with the depth of the vine stems just below the nut clusters and despite such vertical or depth adjustment the plane of movement of the blade in the horizontal may be preserved. It will be appreciated that this is important when considering that a plate blade is used and that of an unusual length and the fact that such long thin plate blade is carried at an angle to the line of draft.

It is obvious that various changes and modifications may be made in the details of construction and design of the above specifically described embodiment of this invention without departing from the spirit thereof, such changes and modifications being restricted only by the scope of the following claims.

What is claimed is:

1. An improved peanut plow comprising a bottom plate, a blade attached to said plate, a wall upstanding from said plate, a second wall spaced from the first mentioned wall and erected upon said plate, a beam entering between said walls and pivoted thereto, and a connecting means spaced from the pivot between said beam and walls and permitting of the adjustment by rotation of the beam in the walls.

2. An improved peanut plow comprising a blade, a frog carrying said blade and comprising top and bottom members, said bottom member comprising a bottom plate and an upstanding side wall at the rear side edge thereof, said top member comprising side and front walls arranged angularly to one another and an inturned base flange on the side wall affixed to said bottom plate with the two side walls spaced apart and the front wall closing the space between said side walls, said side walls having arcuate coincident slots therein, a beam pivoted between the side walls below the slots, and a pin affixed in the beam and having its end portions playing through said slots.

3. An improved peanut plow comprising a beam, a support to which a forward portion of said beam is pivoted, said support having vertically elongated curved slots, a fastening and binding member carried by said beam and engaged through said slots for binding upon the walls of the slots to adjust the vertical angular position of the beam, a frog carried by said beam, a plate blade carried by said frog, said frog pivoted to said beam, said frog having horizontally elongated curved slots, and a fastening member carried by said beam movable in said last mentioned slots and bindable against the walls of the last mentioned slots.

TOOMBS HOWARD.
EDGAR R. BARR.

REFERENCES CITED

The following references are of record in the file of this patent:

UNITED STATES PATENTS

| Number | Name | Date |
|---|---|---|
| 1,797,476 | McCain | Mar. 24, 1931 |
| 1,937,436 | Roach | Nov. 28, 1933 |
| 1,290,490 | Beach | Jan. 7, 1919 |
| 2,236,931 | Whitton | Apr. 1, 1941 |
| 2,167,044 | Henderson | July 25, 1939 |
| 2,302,502 | Morkoski | Nov. 17, 1942 |
| 1,443,171 | Dupler | Jan. 23, 1923 |
| 1,592,962 | Sample | July 20, 1920 |
| 2,338,374 | Baldwin | Jan. 4, 1944 |
| 970,212 | Goe | Sept. 13, 1910 |
| 1,521,503 | Bruinekool | Dec. 30, 1924 |
| 471,687 | Rosencrans | Mar. 29, 1892 |
| 1,285,276 | McArdle | Nov. 19, 1918 |
| 1,864,291 | Benjamin | June 21, 1932 |